US011250277B2

(12) United States Patent
Reeves et al.

(10) Patent No.: US 11,250,277 B2
(45) Date of Patent: Feb. 15, 2022

(54) ALTERNATING CROSSED ALIGNMENT OBJECT DETECTION

(71) Applicant: Universal City Studios LLC, Universal City, CA (US)

(72) Inventors: Dennis Reeves, Orlando, FL (US); Tracy Green, Ocoee, FL (US); Cesar Guarderas, Orlando, FL (US); Cole Hirapara, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 57 days.

(21) Appl. No.: 16/601,372

(22) Filed: Oct. 14, 2019

(65) Prior Publication Data
US 2020/0175287 A1    Jun. 4, 2020

Related U.S. Application Data

(60) Provisional application No. 62/774,123, filed on Nov. 30, 2018.

(51) Int. Cl.
| | | |
|---|---|---|
| G06K 9/00 | (2006.01) | |
| G01S 17/86 | (2020.01) | |
| G01S 17/04 | (2020.01) | |
| B60N 2/00 | (2006.01) | |

(52) U.S. Cl.
CPC ......... *G06K 9/00805* (2013.01); *B60N 2/002* (2013.01); *G01S 17/04* (2020.01); *G01S 17/86* (2020.01)

(58) Field of Classification Search
CPC ..... G06K 9/00805; G01S 17/86; G01S 17/04; B60N 2/002
See application file for complete search history.

(56) References Cited

U.S. PATENT DOCUMENTS

| | | | | |
|---|---|---|---|---|
| 4,555,633 | A | * 11/1985 | Bjorkelund | G01V 8/20 250/559.15 |
| 5,149,921 | A | 9/1992 | Picado | |
| 6,353,394 | B1 | * 3/2002 | Maeda | B60N 2/002 177/144 |
| 8,152,198 | B2 | * 4/2012 | Breed | B60R 21/0152 280/735 |
| 2018/0365550 | A1 | 12/2018 | Brown | |
| 2021/0102804 | A1 | * 4/2021 | Lai | G01S 17/87 |

FOREIGN PATENT DOCUMENTS

| | | |
|---|---|---|
| EP | 2180348 | 4/2010 |
| EP | 2985564 | 2/2016 |

OTHER PUBLICATIONS

PCT/US2019/061985 International Search Report and Written Opinion dated Mar. 2, 2020.

* cited by examiner

*Primary Examiner* — Gregory M Desire
(74) *Attorney, Agent, or Firm* — Fletcher Yoder, P.C.

(57) ABSTRACT

Systems and methods are disclosed that perform occupancy detection. Photoelectric sensors, such as through sensors, are arranged in an angled cross pattern, such that light beams of the through sensors cover a substantial portion of the seating surface of a seat. Upon interruption of a light beam making up the angled cross pattern, an object is detected in the seat. The through sensors may be held in a narrow armrest of a seat by a bracket attached to the seat frame. Further, through sensors for neighboring seats may also be held by the bracket.

20 Claims, 9 Drawing Sheets

ALTERNATING CROSSED ALIGNMENT OBJECT DETECTION

CROSS-REFERENCE TO RELATED APPLICATION

This application claims the benefit of U.S. Provisional Application No. 62/774,123, entitled "ALTERNATING CROSSED ALIGNMENT OBJECT DETECTION," filed Nov. 30, 2018, which is incorporated herein by reference in its entirety for all purposes.

BACKGROUND

The present disclosure relates generally to object detection. More specifically, certain embodiments of the present disclosure relate to alternating alignment of sensors for detection of objects.

Amusement park rides are becoming increasingly sophisticated, providing more significant thrills and more intricate designs than ever before. Further, ride safety is of utmost importance. Unfortunately, thorough safety equipment oftentimes may hinder creative constraints that would improve aesthetics of the ride.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

Current embodiments relate to object detection systems that provide extensive coverage area for object detection, while maintaining a low profile, such that the object detection systems may be implemented in a manner that minimizes hindrance to creative constraints. An alternating pair of through-beam sensors are positioned in a cross pattern. This configuration allows the sensors to completely cover a cross section of the curved seat, while allowing the devices to fit completely into a limited space in the armrest of a seat, resulting in increased aesthetics and coverage over traditional object detection systems.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
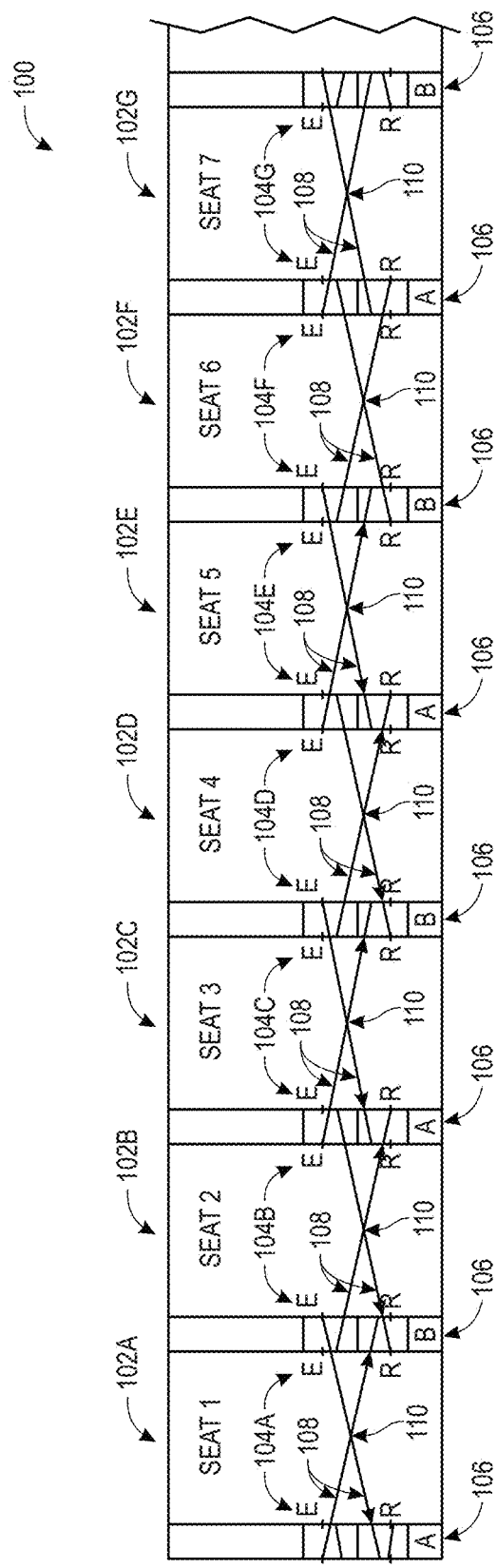
FIG. 1 is a schematic view of a row of seats with an object detection system, in accordance with embodiments of the present disclosure.

FIG. 1 is a schematic top-down view of a row 100 of seats 102A-G with installed object detection systems 104A-G, in accordance with embodiments of the present disclosure. As illustrated, each of the object detection systems 104A-G are installed in armrests 106 of the seats 102A-G. The object detection systems 104A-G each include sensors that are used to detect occupancy of a seat. As will be discussed in more detail below, such occupancy information may be useful to implement safety features of an attraction and/or may be useful to provide targeted attraction features to particular seats based upon occupancy status.

In the current arrangement, the sensors include photoelectric sensors. More specifically, a through beam sensor arrangement of emitter and receiver pairs are used to discover the presence of an object in the seats. To do this, a sensor configuration of 2 emitters (E) and 2 receivers (R) is used to cover the relevant seating area, where object detection should occur. The emitters are directed in a manner such that light beams 108 are provided from the receivers in a cross formation 110 across each of the seats 102A-G. As will be illustrated in subsequent figures, the cross formation is also angled, such that the beams are not parallel to the seat bottoms. This allows for a wider range of seat coverage by the sensors.

With through beam sensors, the receivers are in line-of-sight of the emitters. When one or more of the light beams 108 are blocked from reaching the receiver, an object is detected. More specifically, when present, the object intersects the light beam between the emitter and receiver. By using the cross formation of the light beams 108, the light beam may cover a larger area, resulting in increased area where an object can intersect the light beams 108. Thus, using such a formation may result in more accurate object detection over through sensors arranged in a different formation.

Figure 2A:
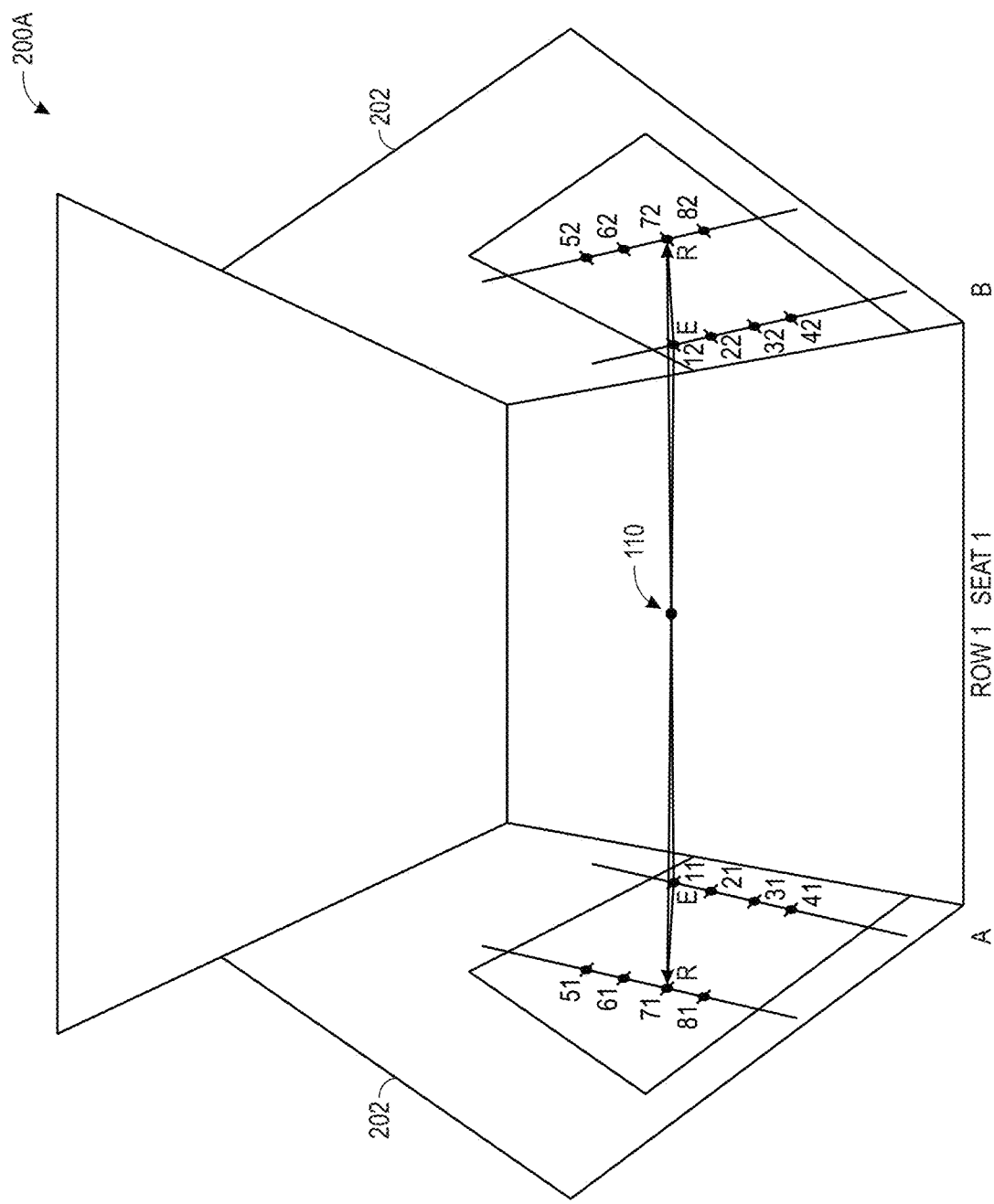
FIGS. 2A-2B are schematic views of individual seats of the row of seats of FIG. 1, in accordance with embodiments of the present disclosure.
Figure 2B:
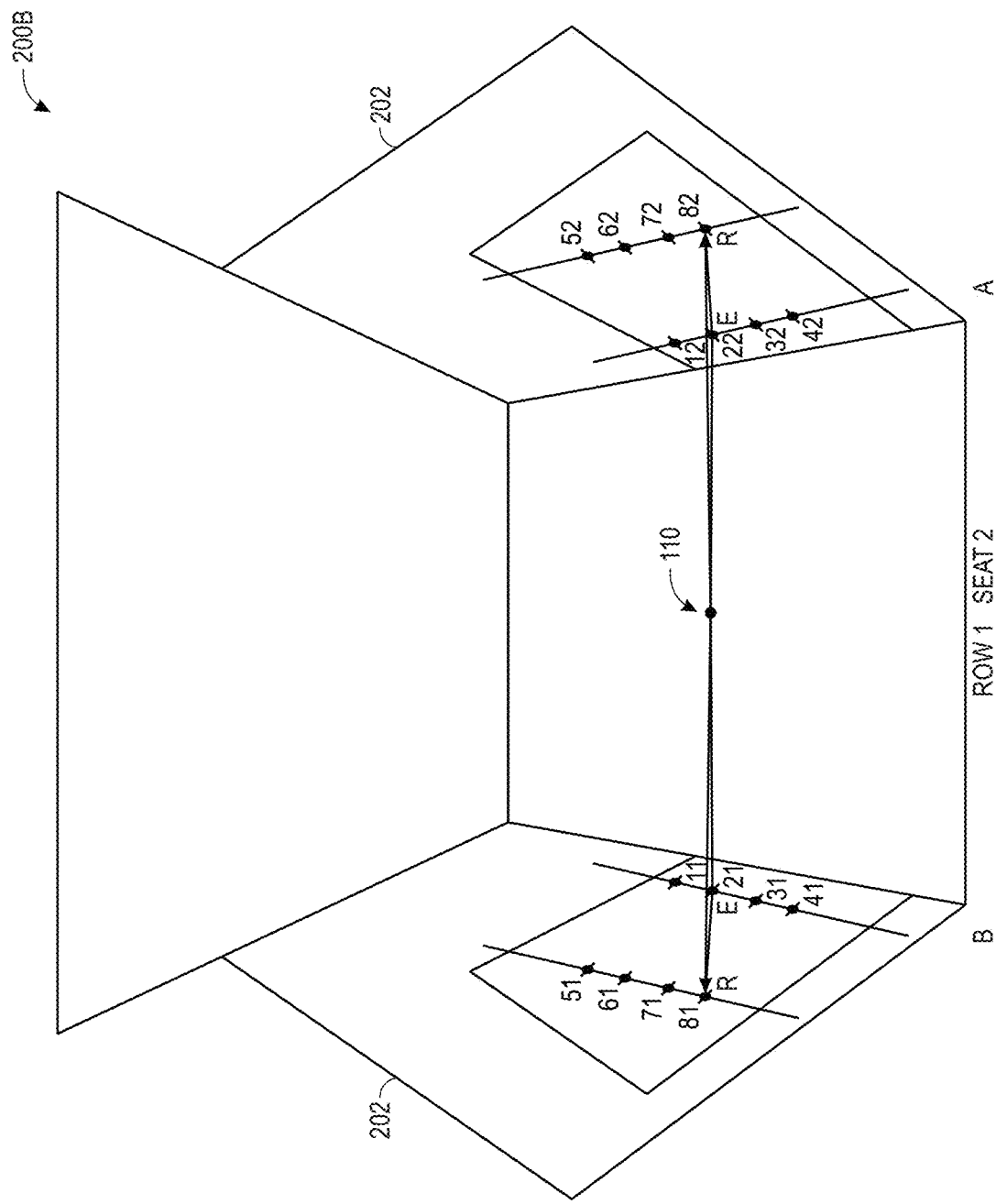

FIGS. 2A-2B are schematic views of individual seats 200A and 200B of the row 100 of seats of FIG. 1, in accordance with embodiments of the present disclosure. As illustrated, the emitter and receiver positions for these seats 200A and 200B are slightly skewed in comparison to one another. For example, seat 200A illustrates emitters at points 11 and 12 and receivers at points 71 and 72. In contrast, neighboring seat 200B in the row 100 is shown with emitters at points 21 and 22 and receivers at points 81 and 82. Thus, the emitters and receivers in seat 200B are moved slightly forward in comparison to the emitters and receivers in seat 200A. As will be discussed in more detail below, this is to allow for emitters and receivers for neighboring seats to be placed in a common armrest (e.g., armrests 202), despite the armrests being relatively narrow (e.g., and unable to support multiple emitters and/or receivers for two neighboring seats in a common position).

As may also be appreciated, each receiver and its corresponding emitter are at different horizontal and vertical positions, causing the angled cross formation 110, as discussed above. The angled cross formation 110 results in a significant coverage area for the through sensors, by generating larger light beams (and therefore larger areas between the emitters and receivers with which an object can intersect the light beam). This can be especially useful with seats that have a curved seating surface, as occupant positioning may dip down, requiring a wider range of detection coverage.

The positioning of the emitters and receivers may alternate for each seat. For example, seat three could have a sensor positioning similar to that of seat 1. Seat 4 could have a similar sensor positioning as seat 2. By using these alternating sensor positionings, emitters and/or receivers may be supported for neighboring chairs in a common narrow armrest. Further, while the 2 emitters are shown in opposing armrests for a particular seat, resulting in the 2 receivers being in opposing armrests for the particular seat, it is important to note that both emitters could be in one armrest and both receivers in the opposing armrest.

Figure 3:
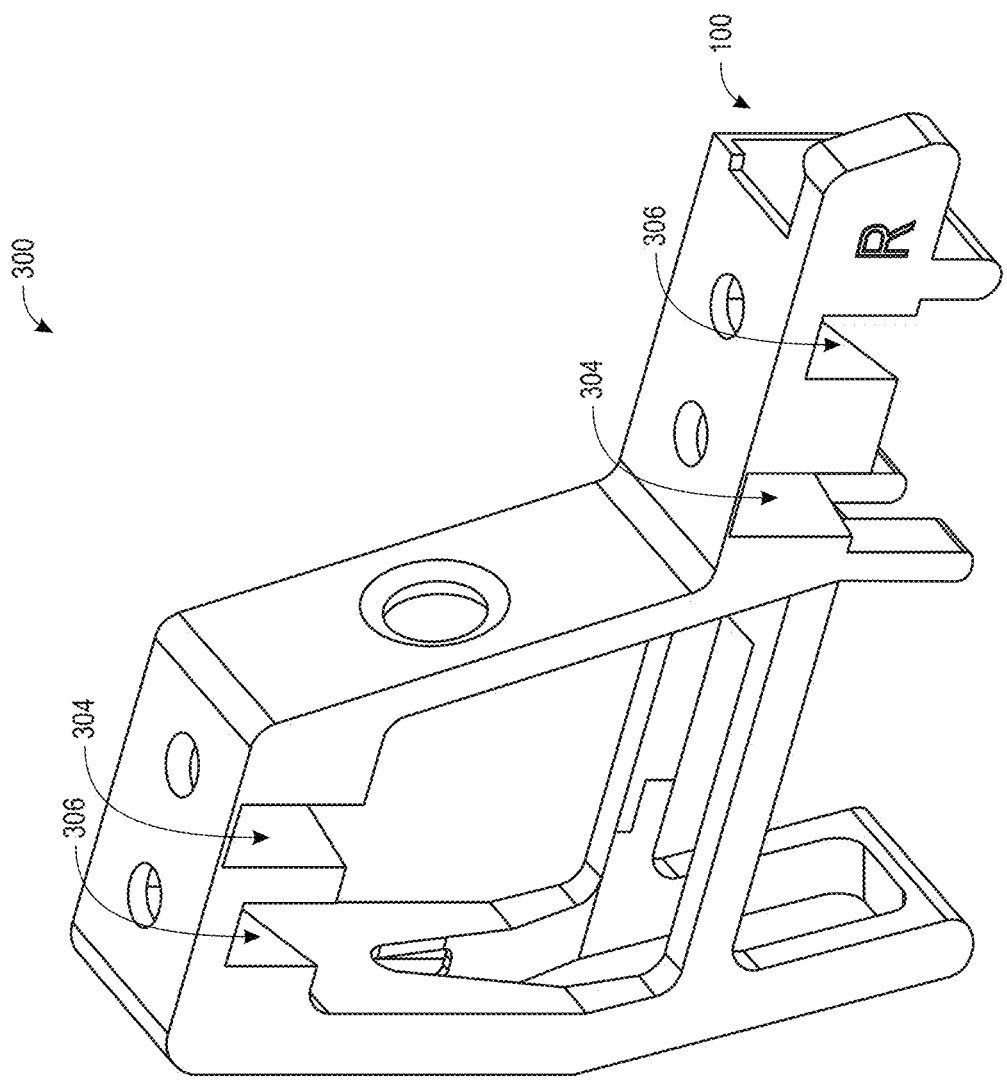
FIG. 3 is a perspective view of a seat bracket used to support the object detection system in the seat, in accordance with embodiments of the present disclosure.

FIG. 3 is a perspective view of a seat bracket 300 used to support the object detection system in the seat, in accordance with embodiments of the present disclosure. The bracket 300 includes a portion 302 for attaching the bracket 300 to a seat frame. Further, voids 304 span the width of the bracket 300 and are sized to hold emitters, which can be oriented to either side of the bracket 300. This enables the bracket 300 to support emitters for two neighboring seats. Voids 306 span the width of the bracket 300 and are sized to hold receivers, which can be oriented to either side of the bracket 300. This enables the bracket 300 to support receivers for two neighboring seats.

Figure 4:
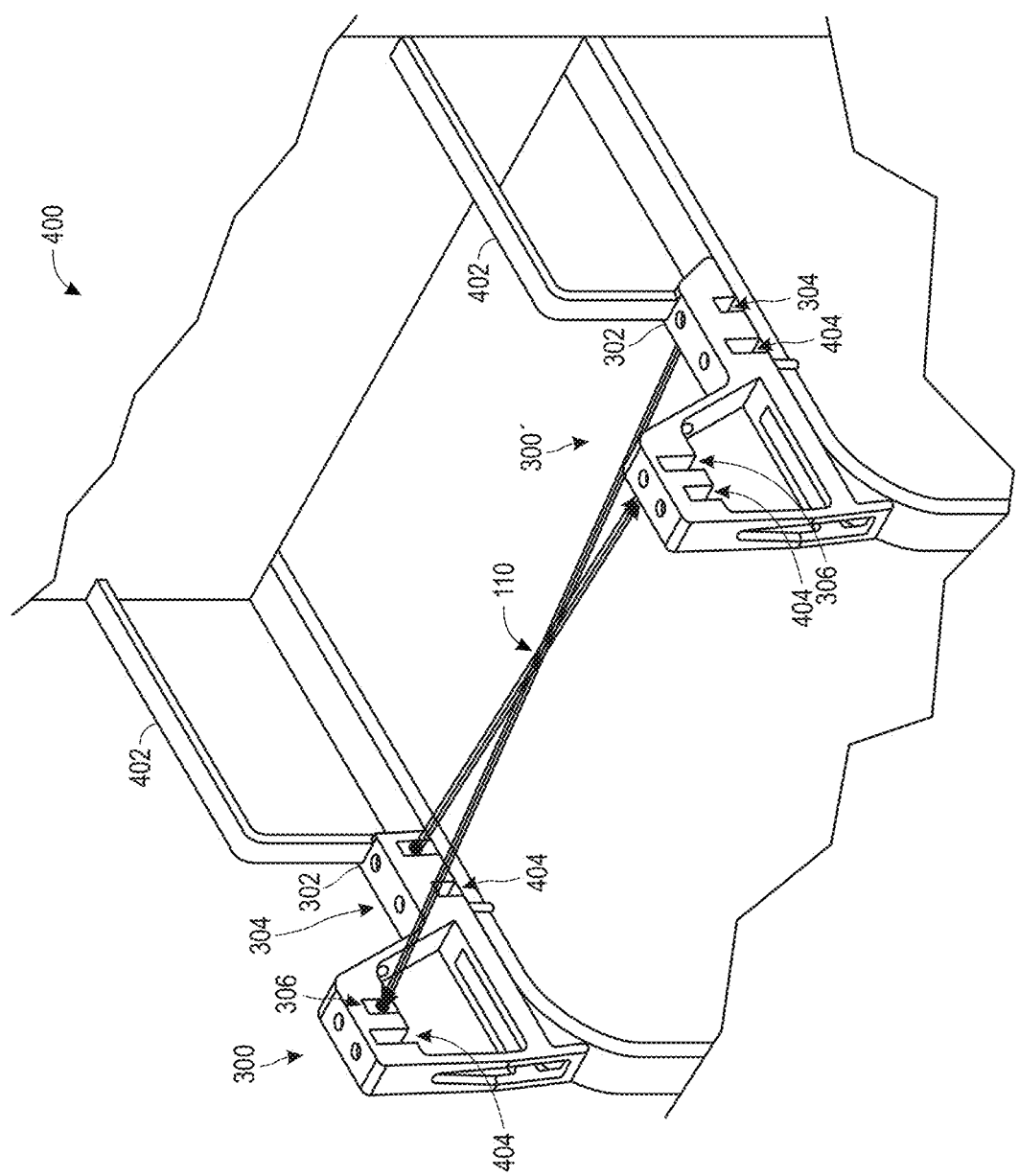
FIG. 4 is a perspective view of a seat with an object detection system installed, in accordance with embodiments of the present disclosure.

FIG. 4 is a perspective view of a seat 400 with an object detection system installed, in accordance with embodiments of the present disclosure. As illustrated, the seat 400 includes bracket 300 and an opposing bracket 300', which is a mirror of bracket 300. Portions 302 facilitate attachment of the brackets 300 and 300' to the seat frames 402. As discussed above, the voids 304 hold emitters, which emit light beams to the receivers held in voids 306. As may be appreciated, the emitters and their corresponding receivers are positioned at different horizontal and vertical positions, resulting in the angled cross formation 110, which spans a significant portion of the seating surface area of the seat. Further, voids 404 are used to hold emitters and/or receivers for neighboring seats (e.g., the voids 404 of bracket 300 hold the emitters and/or receivers for the neighboring chair to the left, which the voids 404 of the bracket 300' hold the emitters and/or receivers for the neighboring chair on the right.

Figure 5A:
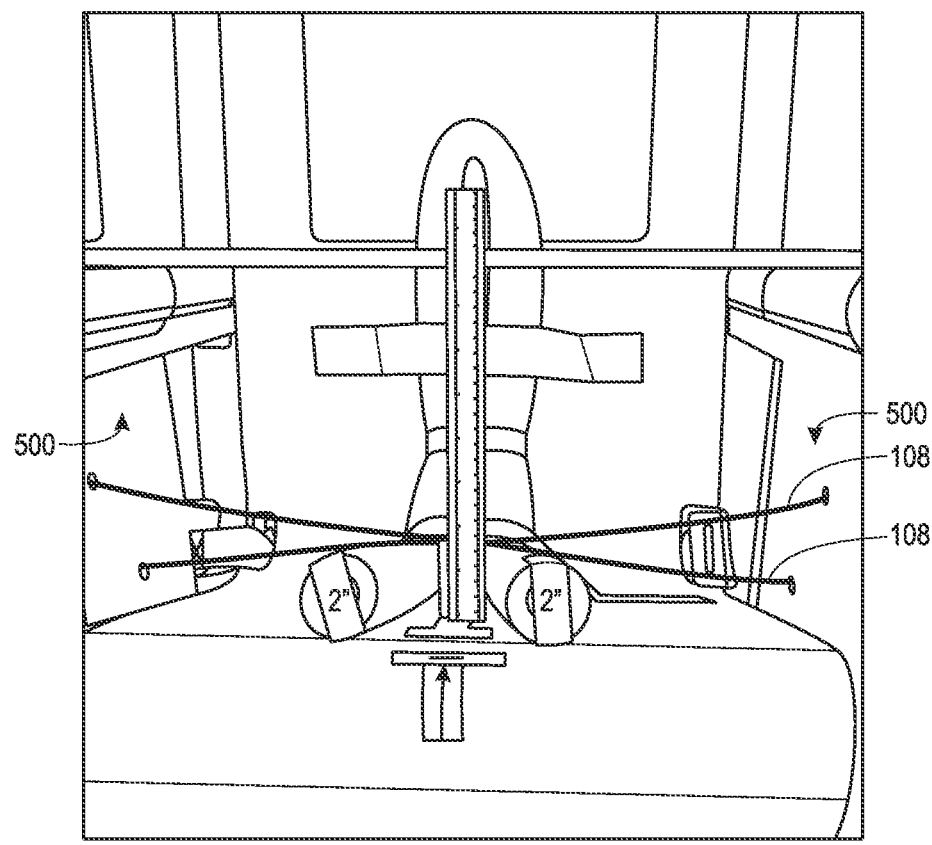
FIGS. 5A-5G are prototype images, illustrating coverage of the object detection system, in accordance with embodiments of the present disclosure.
Figure 5B:
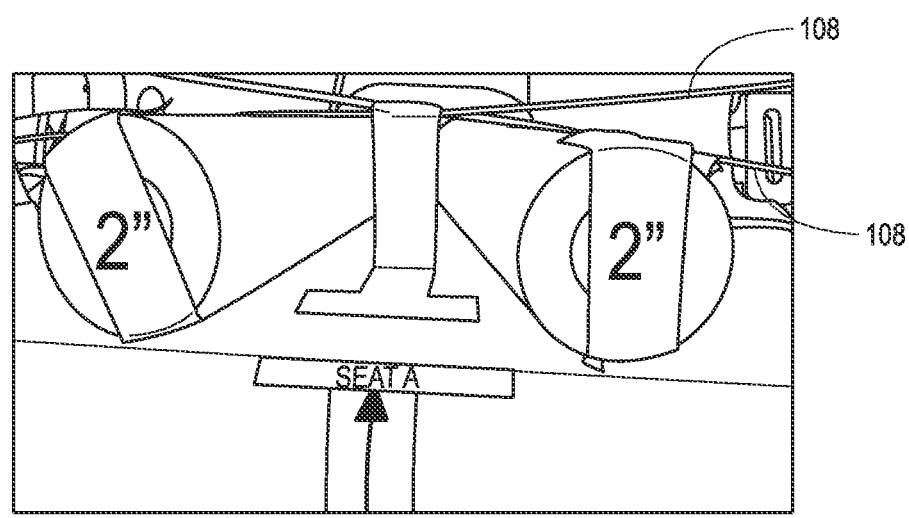
Figure 5C:
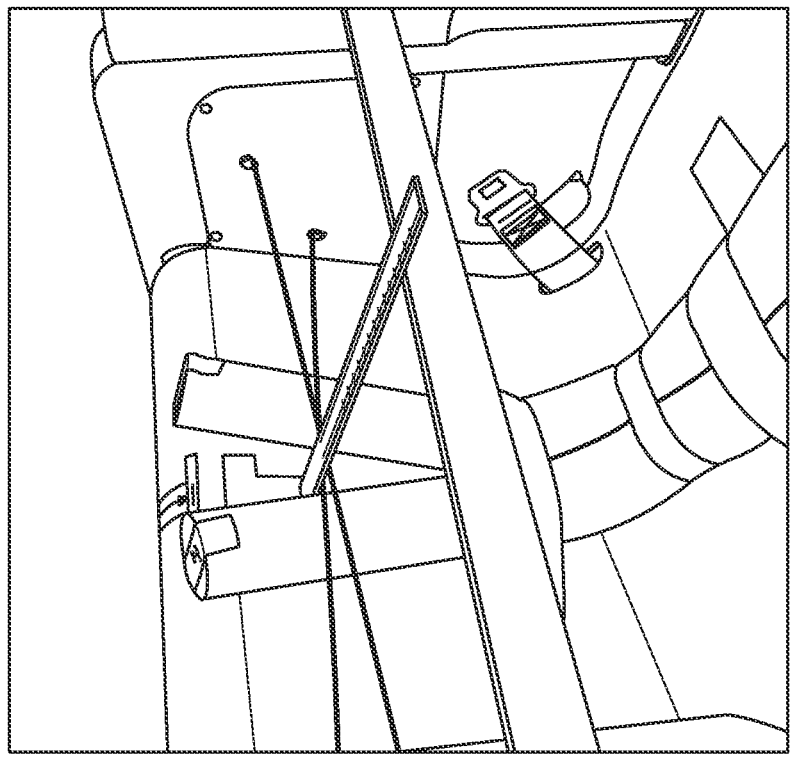
Figure 5D:
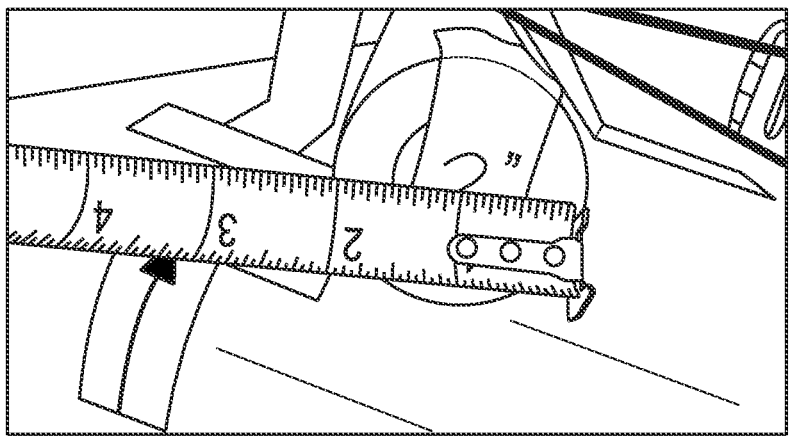
Figure 5E:
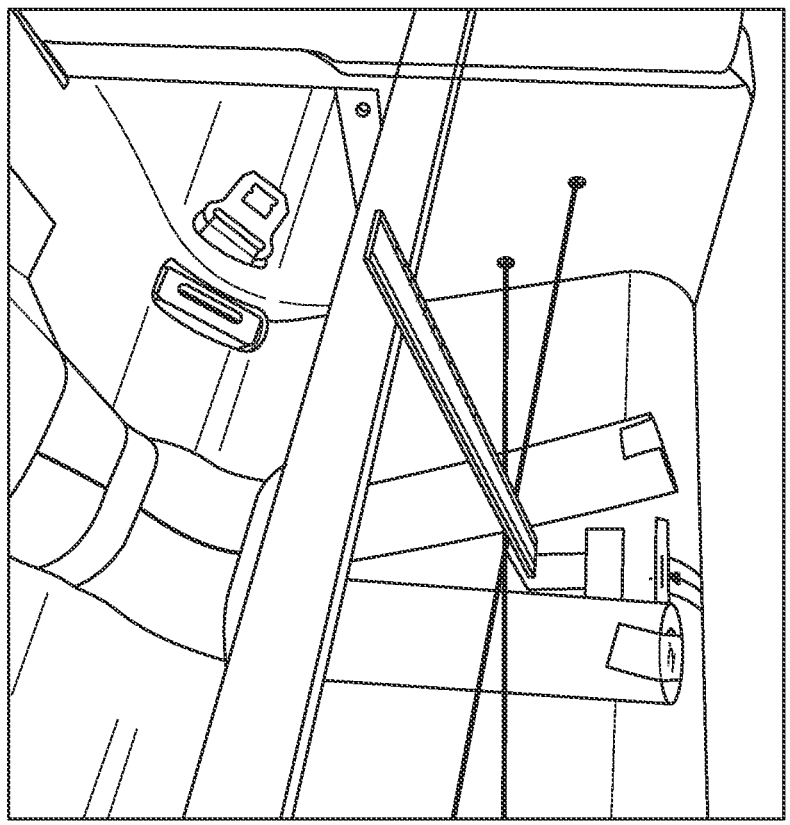
Figure 5F:
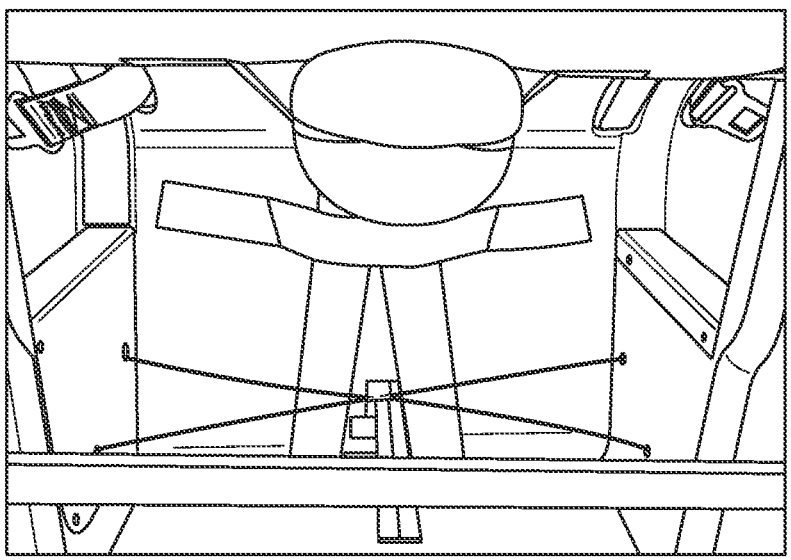
Figure 5G:
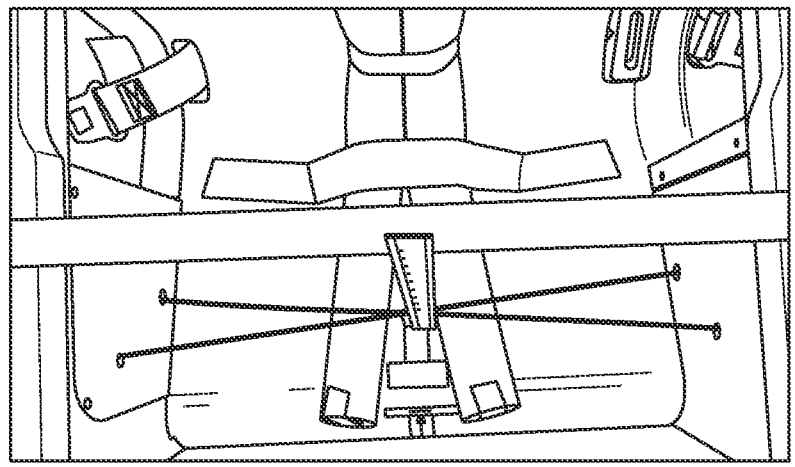

FIGS. 5A-5G are prototype images, illustrating coverage of the object detection system, in accordance with embodiments of the present disclosure. For demonstration sake, white ropes are used to illustrate the light beams generated by the emitters held in the seat armrests. As illustrated in FIG. 5A, an armrest cover 500 covers the brackets and sensors, protecting the sensors and also providing improved aesthetics to the seat. As illustrated, even a very small occupant of the seat (e.g., with a rise of two inches from the seat bottom) will be detected by using the angled cross formation for the through sensors. In other words, in the demonstrated example, an occupant with very narrow legs (e.g., 2-inch diameter) would cause an interruption in the angled cross formation of the light beams, causing an object to be detected in the seat. FIG. 5B shows a close up view of the seat bottom and an object that rises two inches above the seat bottom. The object intersects the light beams 108, causing the occupant to be detected in the seat. FIG. 5C illustrates the same example from an overhead view. FIG. 5D illustrates the 2-inch diameter of the mock occupant in the seat. FIGS. 5E-G are alternative overhead views, illustrating the coverage of the angled cross formation of the through sensor light beams.

Figure 6:
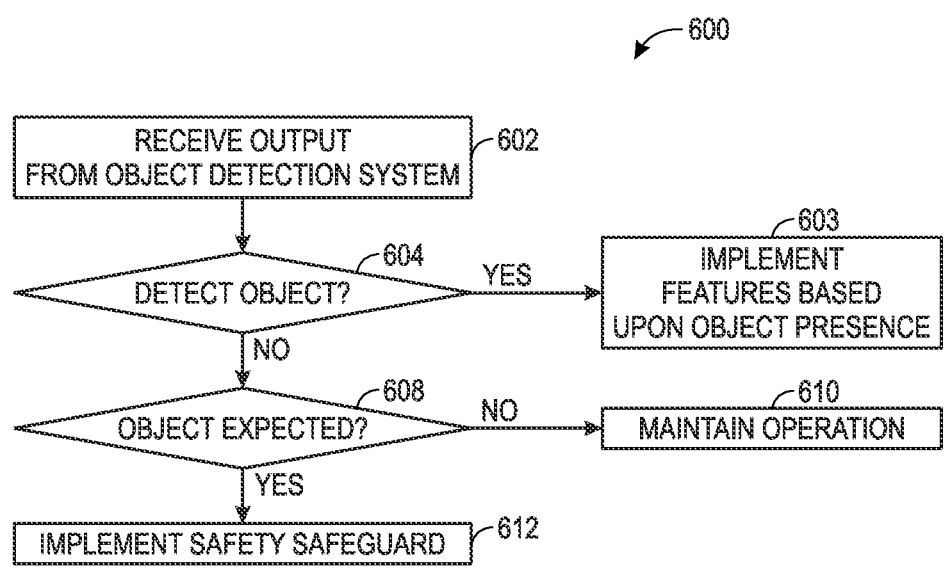
FIG. 6 is a flowchart, illustrating a process for ride control based upon outputs from the object detection system, in accordance with embodiments of the present disclosure.

FIG. 6 is a flowchart, illustrating a process 600 for ride control, performed by a control system, based upon outputs from the object detection system, in accordance with embodiments of the present disclosure. The process 600 begins by receiving an output from the object detection system (block 602). The output indicates a detected occupancy status of a particular seat in an entertainment attraction. For example, the output could be an indication that seat 1 is occupied (e.g., an object is detected in seat 1) or, alternatively, that seat 1 is not occupied (e.g., an object is not detected in seat 1). The output may be provided by a processor of the objection detection system that generates the output based upon whether at least one of the light beams generated by the object detection system does not reach an expected receiver. In such a case, this may indicate that an object is detected (e.g., that a seat is occupied).

At decision block 604, if the output indicates that an object is detected, optional targeted features may be triggered at occupied seats (block 606). For example, videos or other graphical content may be presented to one or more occupied seats, while not providing these features to unoccupied seats. As another example, if occupancy is detected, an automated seat belt check can be performed by polling seat belt sensors for an indication of whether a seat belt is fastened for the occupied seat. Such a check could be limited to only occupied seats, resulting in a better understanding of whether guests are wearing seat belts, while reducing indications of unfastened seat belts for unoccupied seats.

If no object is detected (e.g., no seat occupancy is detected), at decision block 608, a determination is made as to whether an object was expected (e.g., occupancy was expected). This can be determined by looking at temporal occupancy data to see if occupancy was previously detected during a current run of the attraction. If so, this may indicate that a guest should be in the seat, as occupancy should not change during an individual run of the attraction. In other words, in some embodiments, the occupancy status should not change between the beginning and the end of an entertainment attraction experience. If such an occupancy change occurs (e.g., an object is expected but not detected), safety safeguards may be implemented (block 612). For example, the attraction may halt until the disparity is solved. Otherwise, if there is no disparity (e.g., no object is detected, but no object is expected) normal attraction operation may be maintained (block 610).

Process 600 is just one example of how the object detection system described herein could be used. Discussion of this process 600 is not intended to limit the scope of how the current object detection system is used. Indeed, there may be many other uses for occupancy detection with regard to a seat.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An object detection system, comprising:
   a first sensor comprising a first emitter and a first receiver;
   a second sensor comprising a second emitter and a second receiver;
   wherein the first sensor and the second sensor are arranged such that light beams generated by the first emitter and the second emitter form an angled cross formation;
   a processor configured to:
      identify whether at least one of the light beams does not reach an expected receiver of the first receiver or the second receiver; and
      provide an indication that an object is detected or that an object is not detected, based upon whether the at least one of the light beams does not reach the expected receiver.

2. The object detection system of claim 1, wherein the first sensor, the second sensor, or both comprise a photoelectric sensor.

3. The object detection system of claim 2, wherein the photoelectric sensor comprises a through sensor.

4. The object detection system of claim 1, wherein the object detection system is disposed in a seat armrest.

5. The object detection system of claim 4, comprising a bracket configured to be disposed in the seat armrest, wherein the bracket comprises a portion configured to attach to a seat frame.

6. The object detection system of claim 4, comprising a bracket configured to be disposed in the seat armrest, wherein the bracket comprises voids configured to hold at least one emitter, at least one receiver or both for a seat.

7. The object detection system of claim 6, comprising additional voids configured to hold at least one second emitter, at least one second receiver, or both for a seat that neighbors the seat.

8. The object detection system of claim 1, wherein the object detection system is configured to detect an object that extends approximately 2-inches above a bottom of a seat.

9. An object detection system bracket, configured to:
   hold a first emitter, first receiver, or both for a first seat; and
   hold a second emitter, second receiver, or both for a second seat neighboring the first seat;
   wherein the first emitter, the first receiver, or both and the second emitter, second receiver, or both are held such that light beams generated by the first emitter and the second emitter form an angled cross formation with additional light beams provided by other emitters.

10. The object detection system bracket of claim 9, comprising a portion configured to attach with a seat frame.

11. The object detection system bracket of claim 9, wherein the object detection system bracket is configured to be disposed in a seat armrest.

12. An entertainment attraction seat, comprising:
   an object detection system configured to detect occupancy of the entertainment attraction seat using an angled cross formation for light beams generated by sensors of the object detection system.

13. The entertainment attraction seat of claim 12, comprising a first bracket disposed in a first armrest, the first bracket configured to support a portion of the sensors of the object detection system for the entertainment attraction seat.

14. The entertainment attraction seat of claim 13, wherein the first bracket is configured to support a portion of sensors for a second object detection system of a seat neighboring the entertainment attraction seat.

15. The entertainment attraction seat of claim 14, wherein the first bracket is configured to support the portion of sensors for the second object detection system at a skewed position from a position of the portion of the sensors of the object detection system.

16. The entertainment attraction seat of claim 13, comprising a second bracket disposed in a second armrest, the second bracket configured to support a second portion of the sensors of the object detection system for the entertainment attraction seat.

17. The entertainment attraction seat of claim 16, wherein the second bracket is configured to support a portion of sensors for a second object detection system of a seat neighboring the entertainment attraction seat.

18. The entertainment attraction seat of claim 16, wherein the second bracket is a mirrored version of the first bracket.

19. The entertainment attraction seat of claim 12, wherein the object detection system comprises a processor configured to provide an indication of occupancy status of the entertainment attraction seat to a control system configured to perform actions based upon the occupancy status.

20. The entertainment attraction seat of claim 12, wherein the sensors are arranged, such that an emitter and receiver pair are in different horizontal and vertical positions in opposing armrests of the entertainment attraction seat.

* * * * *